T. L. WEBSTER.
Wagon-Brakes.

No. 156,746. Patented Nov. 10, 1874.

Witnesses.
Ewell A. Dick
W. E. Chaffee

Inventor.
Theodore L. Webster
by atty A. Houck

UNITED STATES PATENT OFFICE.

THEODORE L. WEBSTER, OF BROOKLYN, NEW YORK.

IMPROVEMENT IN WAGON-BRAKES.

Specification forming part of Letters Patent No. 156,746, dated November 10, 1874; application filed September 21, 1874.

*To all whom it may concern:*

Be it known that I, THEODORE L. WEBSTER, of Brooklyn, Kings county, New York, have invented certain new and useful Improvements in Brakes for Heavy-Running Vehicles, of which the following is a specification:

My improvements in brakes are adapted for all heavy-running vehicles, whether road-wagons or railway-cars. The wheels are braked by means of eccentrics mounted on the ends of a cross-bar supported in bearings, in which it can slide to and from the wheels of the vehicle, and acted on by a pressure-bar, which, in its turn, is operated by the animal or animals drawing the vehicle, in case it be a road-wagon, or by the car in front, in case it be a railway-car. Mechanism on a like general plan has been heretofore devised for a like purpose. I therefore make no broad claim to operating the braking mechanism by the holding back of the team or the retarding of the car in front. My improvements relate to the arrangement of the pressure-bar, and cross-bar, and eccentrics, as hereinafter explained.

Figure 1:
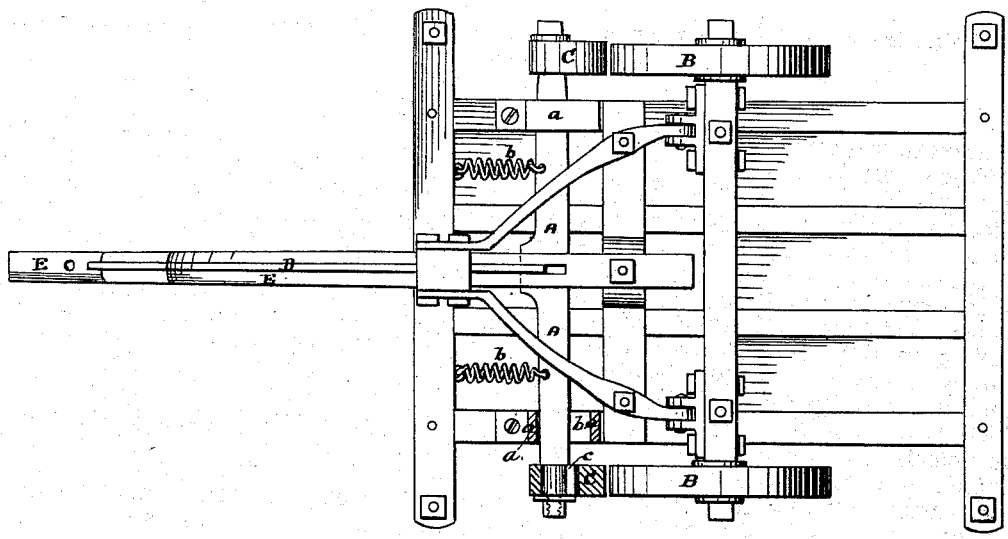
Figure 2:
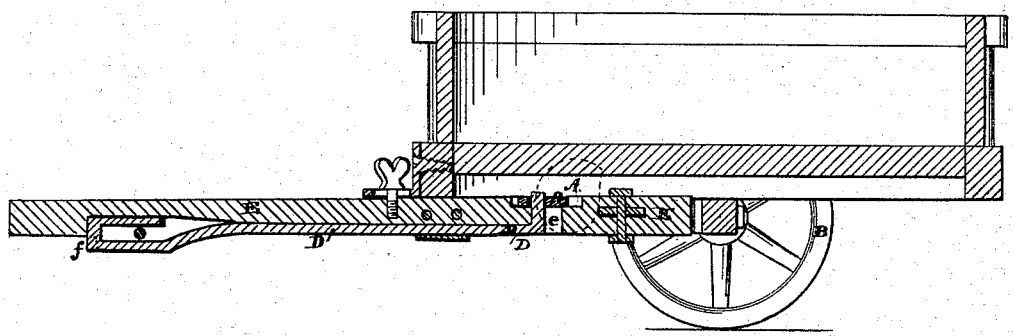
Figure 3:
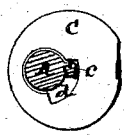

In the accompanying drawing, Figure 1 is an under-side view of a cart or wagon provided with my improvements. Fig. 2 is a longitudinal vertical central section of the same. Fig. 3 is a view of one of the eccentrics detached, with hub of the cross-bar on which it is mounted.

A is the cross-bar that carries the eccentrics. It is placed on the under side of the wagon, and is supported by bearings $a$, in which it can slide horizontally back and forth, toward and away from the wheels B to be braked. It is held away from the wheels by springs $b$. Upon hubs on the ends of the cross-bar, and opposite to the wheels B, are mounted eccentrics C, capable of rotating on said hubs. The extent of their revolution is governed by keys $c$ on the hubs, working in segmental recesses $d$ in the eccentrics, which recesses extend about one-eighth of a circle around the hubs. Each eccentric is so shaped that, by the time the key $c$ approaches near to the end of recess $d$, as seen in Fig. 3, the bearing-face of the eccentric will be brought opposite to, and so as to bear on, the wheel. The eccentric is induced to take this position by the frictional contact which is brought about between the wheel and eccentric when the wheel is revolving forward and the cross-bar is pushed back. When, on the contrary, the wheel is moving backward, in backing the wagon, the recess $d$ will allow the eccentric to move to bring its less eccentric portion opposite to the wheel, so that, in effect, during the backward movement of the wagon, the eccentric will roll on the wheel and offer no obstacle to its free movement, even though the cross-bar be pushed back so as to bring the eccentrics up against the wheels. The length of the cross-bar bearings $a$ is such that they arrest the backward movement of the bar at a point where no injurious pressure can be exerted on the wheels by the braking mechanism during the backing of the wagon. The combination of the keys and recesses forms a convenient means of regulating and limiting the movement of the eccentrics. The device for giving movement to the cross-bar consists of an incased pressure-bar, D, supported throughout its whole length against any lateral strain, and arranged to be entirely out of the way. This is effected, in the present instance, by inserting it in a longitudinal groove in the under side of the tongue E. The rear end of the pressure-bar is turned upward in a hook form, and passes through a slot, $e$, in the tongue into a hole in the cross-bar A, as seen in Fig. 2. A projection, $f$, is provided on the front end of the pressure-bar, against which bears some portion of the harness or the ring of the holdback-bar, so that when the team holds back the pressure-bar will be caused to slide back, and so actuate the braking mechanism.

I have illustrated my improvements as applied to a road-wagon, but the same are applicable to railway-cars. When the engineer puts the brake on the locomotive, the brake will be applied to each car as fast as they approach each other. Thus the braking of the whole train is under the control of the engineer. On down grades the brake will operate more efficiently than the old style of hand-brake.

Having described my improvements, what I claim, and desire to secure by Letters Patent, is—

1. In combination with the cross-bar and keys thereon, the eccentrics mounted on hubs on said cross-bars, and provided with recesses to operate in connection with said keys, as set forth.

2. The combination of the incased pressure-bar, the sliding cross-bar and its bearings, and the eccentrics mounted on said cross-bar, and controlled in their movements by means of keys on the cross-bar working in recesses in the eccentrics, as set forth.

In testimony whereof I have hereunto signed my name this 12th day of September, A. D. 1874.

THEODORE L. WEBSTER.

Witnesses:
    F. W. HANAFORD,
    HENRY ENTENSA.